US008528194B2

(12) United States Patent
Pedrazzini

(10) Patent No.: US 8,528,194 B2
(45) Date of Patent: Sep. 10, 2013

(54) APPARATUS AND PROCESS FOR REMOVING FLEXIBLE FILM SEALS FROM TUBULAR SPECIMEN CONTAINERS

(75) Inventor: Gianandrea Pedrazzini, Paradiso (CH)

(73) Assignee: Inpeco Holding Ltd., Valletta (MT)

( * ) Notice: Subject to any disclaimer, the term of this patent is extended or adjusted under 35 U.S.C. 154(b) by 1102 days.

(21) Appl. No.: 12/439,468

(22) PCT Filed: Sep. 1, 2006

(86) PCT No.: PCT/EP2006/065907
§ 371 (c)(1),
(2), (4) Date: Jul. 2, 2009

(87) PCT Pub. No.: WO2008/025376
PCT Pub. Date: Mar. 6, 2008

(65) Prior Publication Data
US 2010/0011555 A1 Jan. 21, 2010

(51) Int. Cl.
*B23P 19/00* (2006.01)

(52) U.S. Cl.
USPC ............ 29/801; 29/426.5; 156/714; 156/764; 81/3.4

(58) Field of Classification Search
USPC .......... 29/801, 426.1, 426.4, 426.5; 156/701, 156/714, 750, 764, 766, 767; 81/3.07, 3.2, 81/3.36, 3.37, 3.39, 3.4, 3.41, 3.56
See application file for complete search history.

(56) References Cited

U.S. PATENT DOCUMENTS

| | | | | |
|---|---|---|---|---|
| 2,732,741 | A * | 1/1956 | Müller-Strobel | 81/3.41 |
| 3,651,751 | A * | 3/1972 | Randrup | 99/275 |
| 3,987,535 | A * | 10/1976 | Brown | 29/426.4 |
| 4,338,767 | A * | 7/1982 | Cochran | 53/492 |
| 4,615,241 | A * | 10/1986 | Grabarski et al. | 81/3.2 |
| 6,564,846 | B1 * | 5/2003 | Ribi | 156/538 |
| 2005/0252342 | A1 * | 11/2005 | Itoh | 81/3.2 |

* cited by examiner

*Primary Examiner* — David Bryant
*Assistant Examiner* — Christopher Koehler
(74) *Attorney, Agent, or Firm* — Birch, Stewart, Kolasch & Birch, LLP

(57) ABSTRACT

It is described an apparatus for removing a flexible film seal (12) from a tubular specimen container (3), comprising a vertical mounting shaft (5) upon which is mounted a holding member (6) for a head assembly (9) having a cavity (13) and pinch means (14, 15). There is provided driving means for causing coupling motion of said head assembly (9) and said specimen container (3) towards each other to receive the seal (12) into said cavity (13), then operating said pinch means for pinching the flexible film seal (12), and finally causing removing motions of said head assembly (9) and said specimen container (3) away from each other to remove the flexible film seal (12) from the head of the specimen container (3).

5 Claims, 14 Drawing Sheets

APPARATUS AND PROCESS FOR REMOVING FLEXIBLE FILM SEALS FROM TUBULAR SPECIMEN CONTAINERS

The present invention concerns an apparatus and a process for removing flexible film seals from tubular specimen containers.

As used herein, the term “container” means an article that contains a solid or liquid and has a tubular opening for access of the contents, e.g., a test tube or vial.

Flexible film seals means “foil or film closure” that is any thin membranous material that covers, seals, and overhangs the annular opening at the top of a container so defined and is bonded to it in such a way that it can be torn free from the opening with a mechanical pulling force applied to the overhanging portion. The word “seal” is used to refer synonymously to a particular foil or film closure of interest.

In modern medical analysis systems, after having removed the cap from the specimen containers for a medical analysis, the openings of said containers are closed by flexible film seals.

If, for any reason, a new test needs to be performed an operator must manually remove the seal, and return the container to the analyser.

This means waste of time and explosure of the operator to biological hazard.

Object of the present invention is to provide an automatic apparatus and a process for removing flexible film seals from tubular containers.

According to the invention said object is achieved by an apparatus for removing a flexible film seal from a tubular specimen container, characterized in that it comprises a vertical mounting shaft upon which is mounted a holding member for a head assembly having a cavity and pinch means, there being provided driving means for causing coupling motion of said head assembly and said specimen container towards each other to receive the seal into said cavity, then operating said pinch means for pinching the flexible film seal, and finally causing removing motions of said head assembly and said specimen container away from each other to remove the flexible film seal from the head of the specimen container.

According to the invention said object is further achieved by a process for removing a flexible film seal from a tubular specimen container by an apparatus according to claims 1-20, characterized in that it comprises the following steps:

- immobilization of the specimen container;
- coupling motion of said head assembly and said specimen container towards each other to receive the seal into said cavity;
- pinching of a portion of the free flexible film seal;
- removing motion of said head assembly and said specimen container away from each other to remove the flexible film seal from the top of the specimen container.

The characteristics and advantages of the present invention will appear evident from the following detailed description of an embodiment thereof illustrated as non-limiting example in the enclosed drawings, in which.

Figure 1:
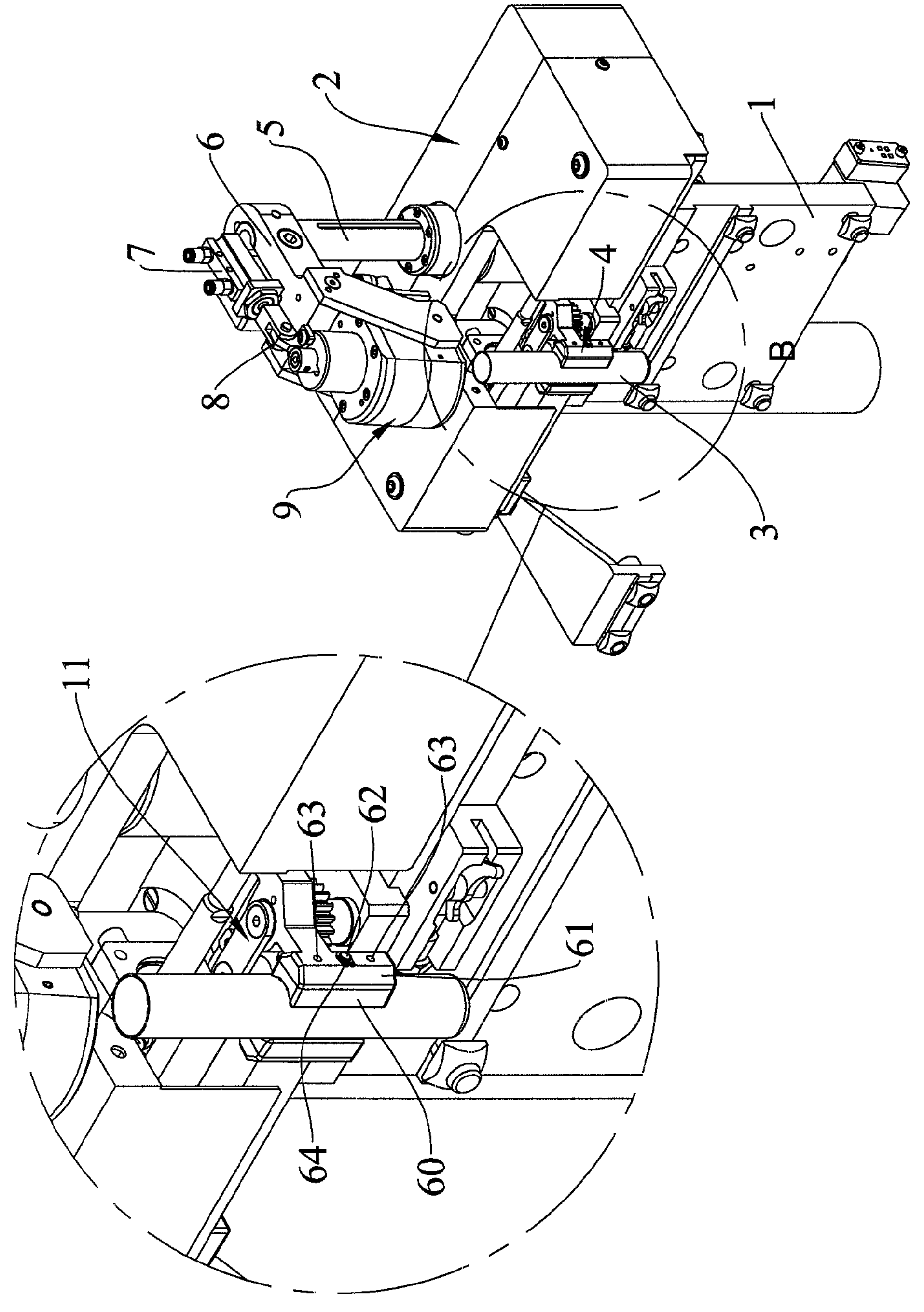
FIG. 1 is a perspective view of the apparatus according to the present invention with an enlarged part.
Figure 2:
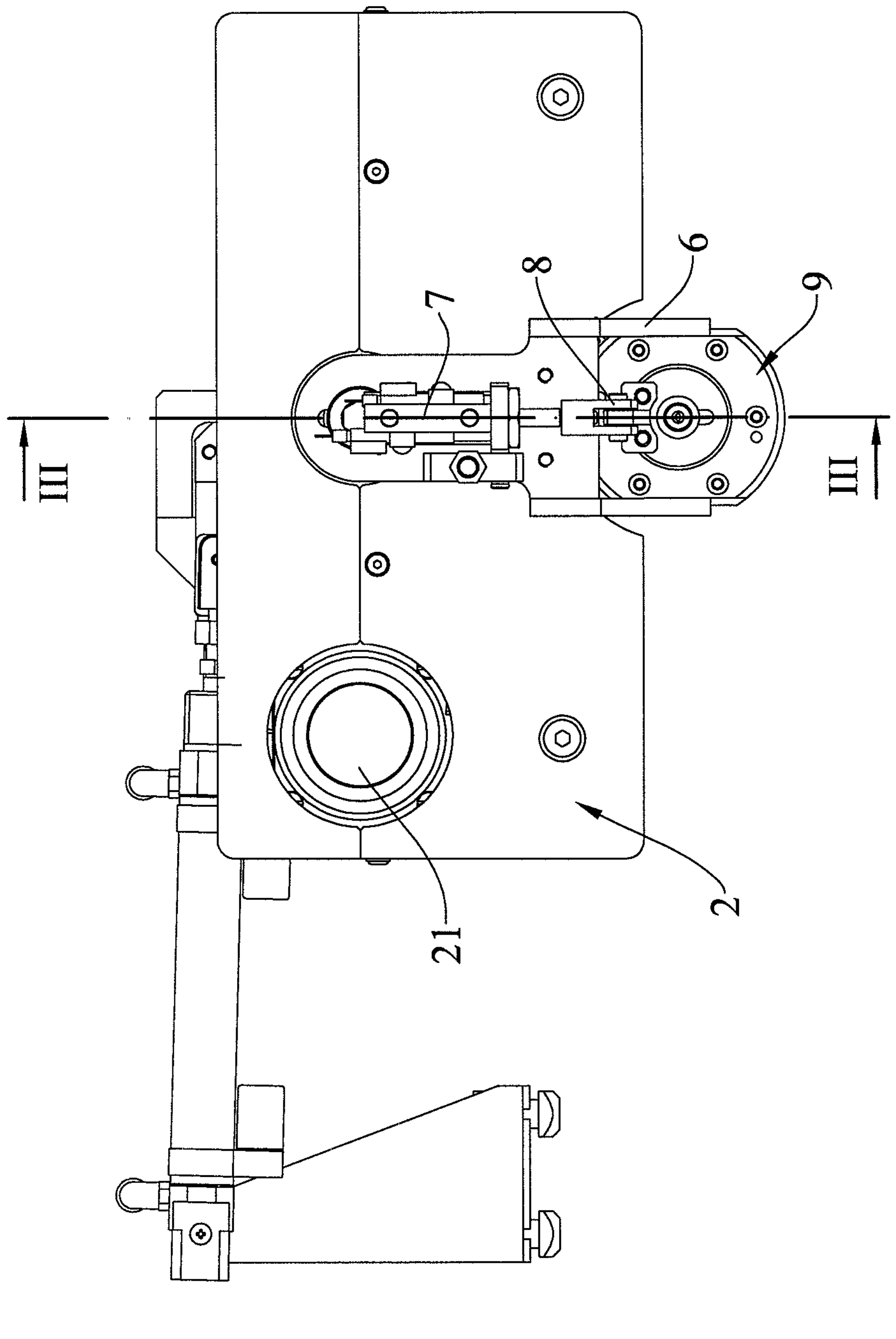
FIG. 2 is a top view of the apparatus of FIG. 1.

Referring now to FIGS. 1 through 14, an apparatus for removing a flexible film seal 12 from a tubular specimen specimen container 3, is mounted to a frame 1 of a conveyor system or parent system, in which the apparatus is incorporated, that processes the specimen container 3. Each specimen container 3 is presented by the parent (conveyor) system to a specific point in space in the system at which point the apparatus will remove the flexible film seal 12.

The apparatus is mounted next to a track (not shown) of the parent system on a platform 2 or similar support.

An articulated pair of gripping arms 4 is incorporated into the apparatus to engage and hold the specimen container 3 during the seal removal operations to be described in FIGS. 3 through 7.

Each one of said gripping arms 4 (FIG. 12) comprises an external portion 61 and an internal portion 60 connected by a transversal central pin 62 and a couple of fingers 63, whose surface may be covered with rubber to increase the gripping capabilities of said fingers at the moment they grab the container, which pin allows a little rotation (few degrees) of the internal part 60, supporting the specimen container 3, with respect to the external part 61.

The gripping arms 4 are actuated by mechanical means 11 which do not need be part of the specimen removing apparatus.

Referring to FIG. 1, the embodiment of the apparatus is comprised of a vertical mounting shaft 5 upon which is mounted a bracket 6 for holding a seal removing head assembly 9. The shaft 5 is mounted in a bearing and is actuated by mechanical drive means to provide vertical travel to all components attached to it by means of the bracket 6.

A pneumatic cylinder motor is used in the current embodiment, but other mechanical drive means, such as a motorized rack and pinion gear may also be embodied.

The head assembly 9 is mounted in such a way that it pivots through a small angle in the mounting bracket 6 along a horizontal axis through the head. The degree of rotation about this axis and the orientation of the axis are important relative to the position of the opening in the specimen container 3 during the removal operation and are described later.

The pivoting impetus is provided to the head assembly 9 in this embodiment by a pneumatic cylinder 7 attached to the mounting bracket 6 and connected to a rotating linkage 8 that is, in turn, attached to the head assembly 9. Other means for actuating the pivot, such as an electric motor and gear assembly, may also be embodied.

The entire seal removing mechanism, consisting of shaft 5, mounting bracket 6, pneumatic cylinder 7, rotating linkage 8, and head assembly 9, is rotated around the shaft 5 in order to position the head assembly 9 directly above one of two relevant stations for its active use.

The first station (FIGS. 1-9) is the position at which the head assembly 9 is directly above the specimen container 3 as it is presented by the track or conveyor of the parent system.

The second relevant position (FIGS. 10-13) is that of a waste chute 21 into which the waste seal 12 will be ejected after being removed from the specimen container 3. Said waste chute 21 is provided with a passage detecting sensor (not shown) for the removed flexible film seal 12.

In the embodiment shown, these two positions are 90° apart around the circular travel of the head assembly 9 as afforded by the rotation of the shaft 5; however, the angular separation of the two is not relevant to the invention and can take on any value that is mechanically feasible. It is further possible to produce other embodiments of motion for the head assembly 9 that do not involve circular motion, e.g. a rectilinear positioning mechanism and suitable drives.

Driving force for the rotational positioning embodiment shown is provided by a pneumatic cylinder (not shown) applied to the shaft 5 but there may also be any suitable drive means such as an electric motor and plenary gear system or the like.

The head assembly 9 comprises a conical cavity 13, an upper pinch plate 14, a lower pinch plate 15 and a pusher arm 17, driven by a piston of a pneumatic cylinder 16, to force a portion 20 of the seal 12 between said pinch plates 14-15.

Said head assembly 9 further comprises a detecting sensor 22 which controls the seal grab by the upper and lower pinch plates 14-15.

Figure 3:
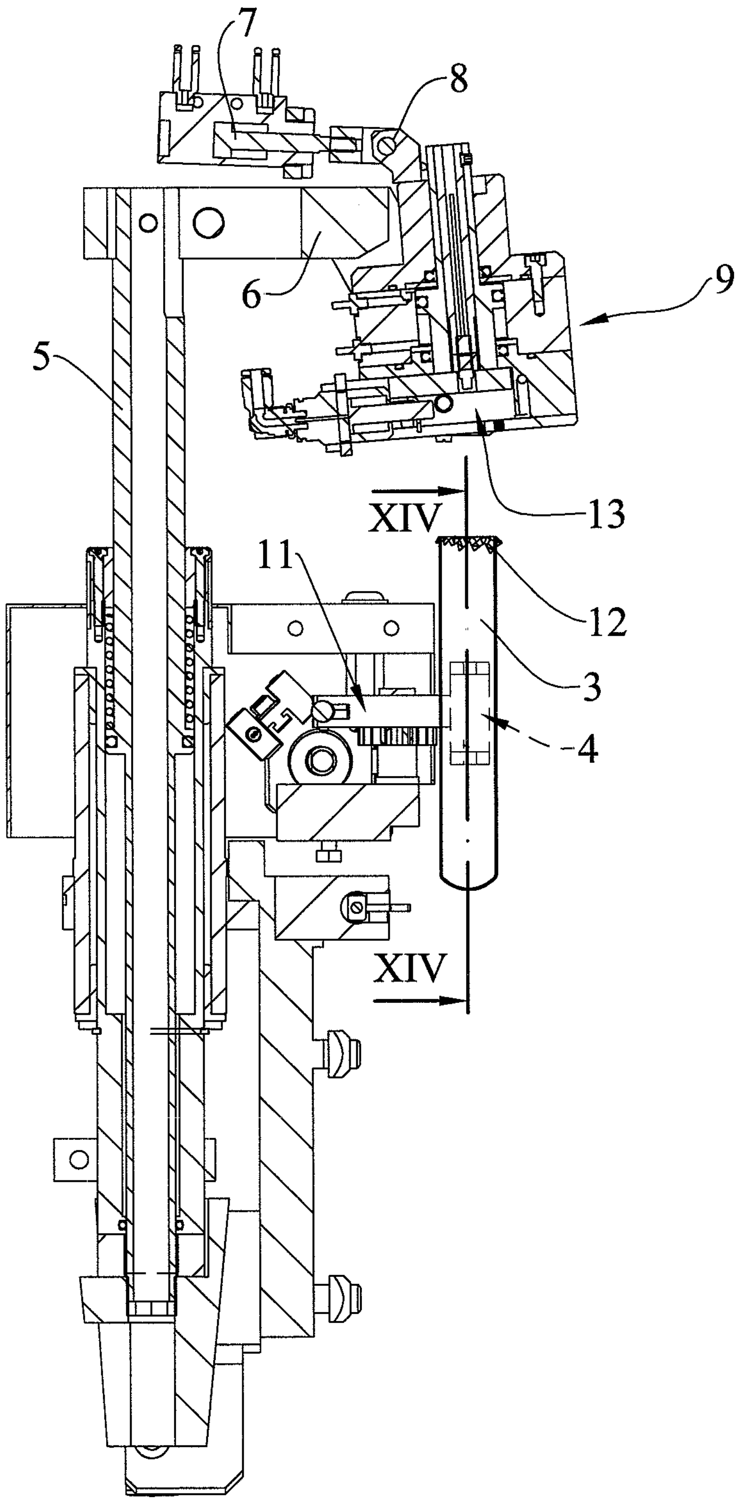
FIG. 3 is a lateral sectional view according to line III-III of FIG. 2.
Figure 4:
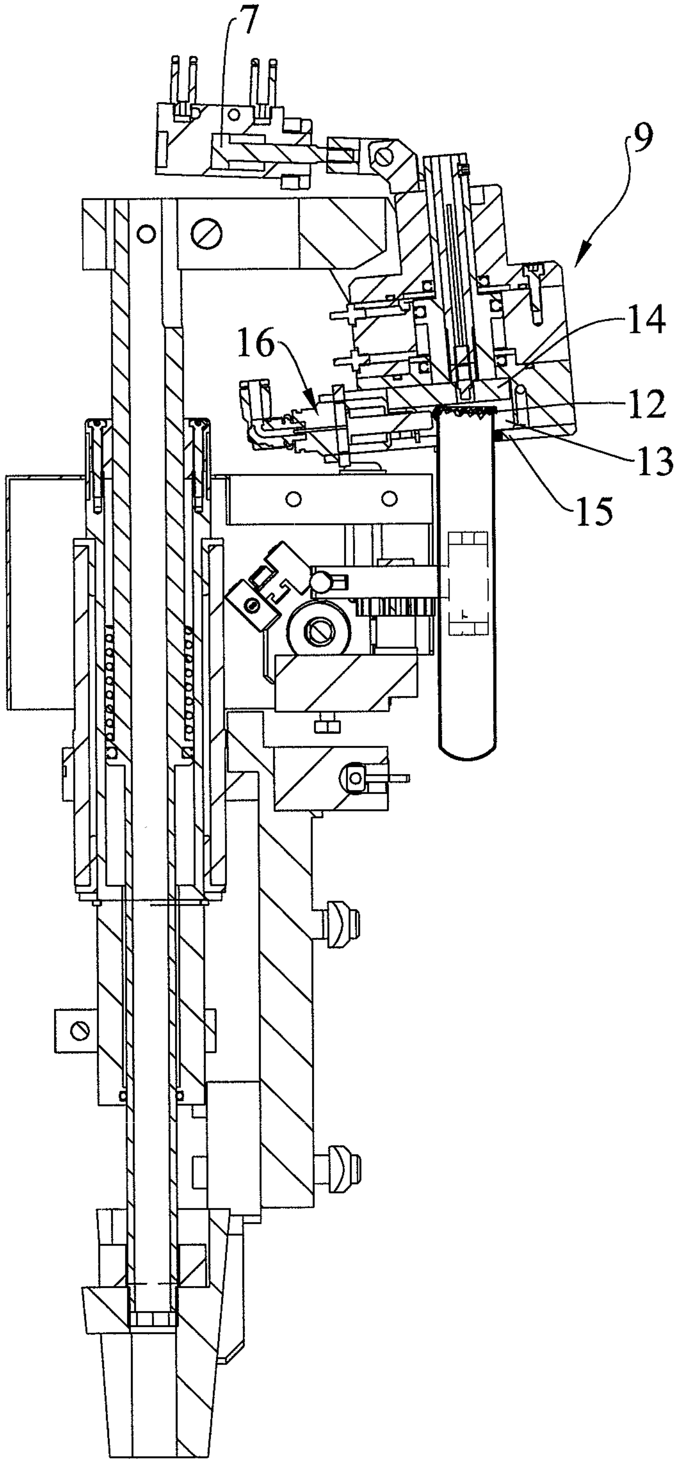
FIG. 4 is the same lateral sectional view of FIG. 3 in a subsequent working position.

The start of the seal removing operation by the apparatus of the invention is marked by the conditions illustrated in FIG. 3. The parent system has previously positioned the specimen container 3 of interest to the designated station for closure removal. The specimen container 3 bears the seal 12 that is to be removed by the apparatus. The specimen container 3 has further been immobilized by the gripping arms 4 closed upon it by a motor and gearing mechanism 11 attached to the mounting platform 2.

Initially the shaft 5 and attached elements are extended upwardly by the vertical drive means to a vertical height sufficient to allow mechanical clearance for positioning the specimen container 3 at the designated seal removal station by the parent system. The shaft 5 is further rotated by the rotational drive means to center the head assembly 9 above the designated seal removal station. Centering of the head assembly 9 is defined relative to a cavity 13 in the underside of the assembly that is substantially circular in cross section with substantially conical walls and depth sufficient to surround the top of the specimen container 3 and seal 12 with particular mechanisms contained in the head assembly 9 and discussed below.

For the purpose of the following discussions, the "back" or "backward" direction relative to the head assembly 9 is toward the shaft 5. The "front" or "forward" direction is away from the shaft 5.

Initially, the pneumatic cylinder 7 is actuated such that the linkage 8 is drawn toward the cylinder 7, causing the head assembly 9 to pivot backward (counterclockwise rotation, FIG. 3) with the upper portion of the head assembly 9 closer to the shaft 5 than the lower portion. The latter contains the pivot axis 80 in contact with the mounting bracket 6. Specifically, said axis 80 belongs or is at least parallel to the plane of the upper pinch plate 14. In this position, the major axis of the substantially cylindrical head assembly 9 forms an angle of approximately 5° with the vertical.

By displacing the head 9 in the backward tilt position, the cavity 13 for receiving the tubular top portion or head 50 of the specimen container 3, is slightly biased toward the back of the container opening, that is, the side of the opening closest to the shaft 5.

In the next operation (FIG. 4) in the seal removing sequence, head assembly 9 is lowered onto the specimen container 3, and therefore also onto the seal 12 by means of the vertical drive mechanism associated with the shaft 5.

By virtue of its conical nature, the cavity 13 in the bottom of the head assembly 9 serves to guide the head onto the tubular top 50 of the specimen container 3.

Figure 5:
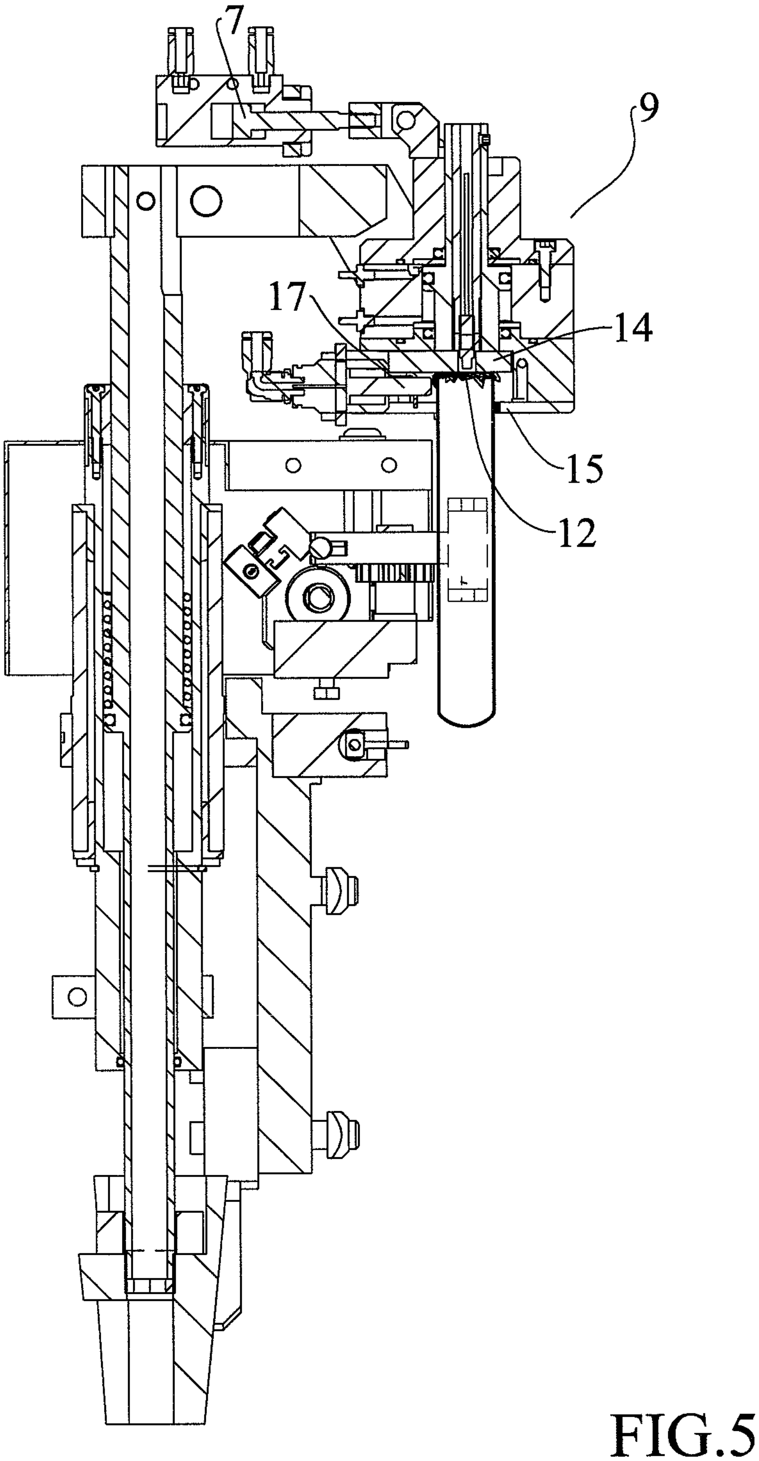
FIG. 5 is the same lateral sectional view of FIG. 4 in a subsequent working position.

Next the pneumatic cylinder 7 is moved to the outward position (clockwise rotation around the pivot axis 80) so as to move the linkage 8 forward, tilting the head assembly 9 forward, to the upper position atop the specimen container 3 as illustrated in FIG. 5. In this position, the major axis of the substantially cylindrical head assembly 9 is aligned with the vertical.

The uppermost surface of the cavity 13 in the head assembly 9 is the upper pinch plate 14, which rests upon the seal 12 atop the specimen container 3.

Next the pneumatic cylinder 7 is moved again to the outward position (clockwise rotation around the pivot axis 80, FIG. 6), so as to form an angle of approximately 5° with the vertical. This rotation causes the tilting of the specimen container 3 due to the rotation of the internal part 60 (see enlarged part).

Figure 6:
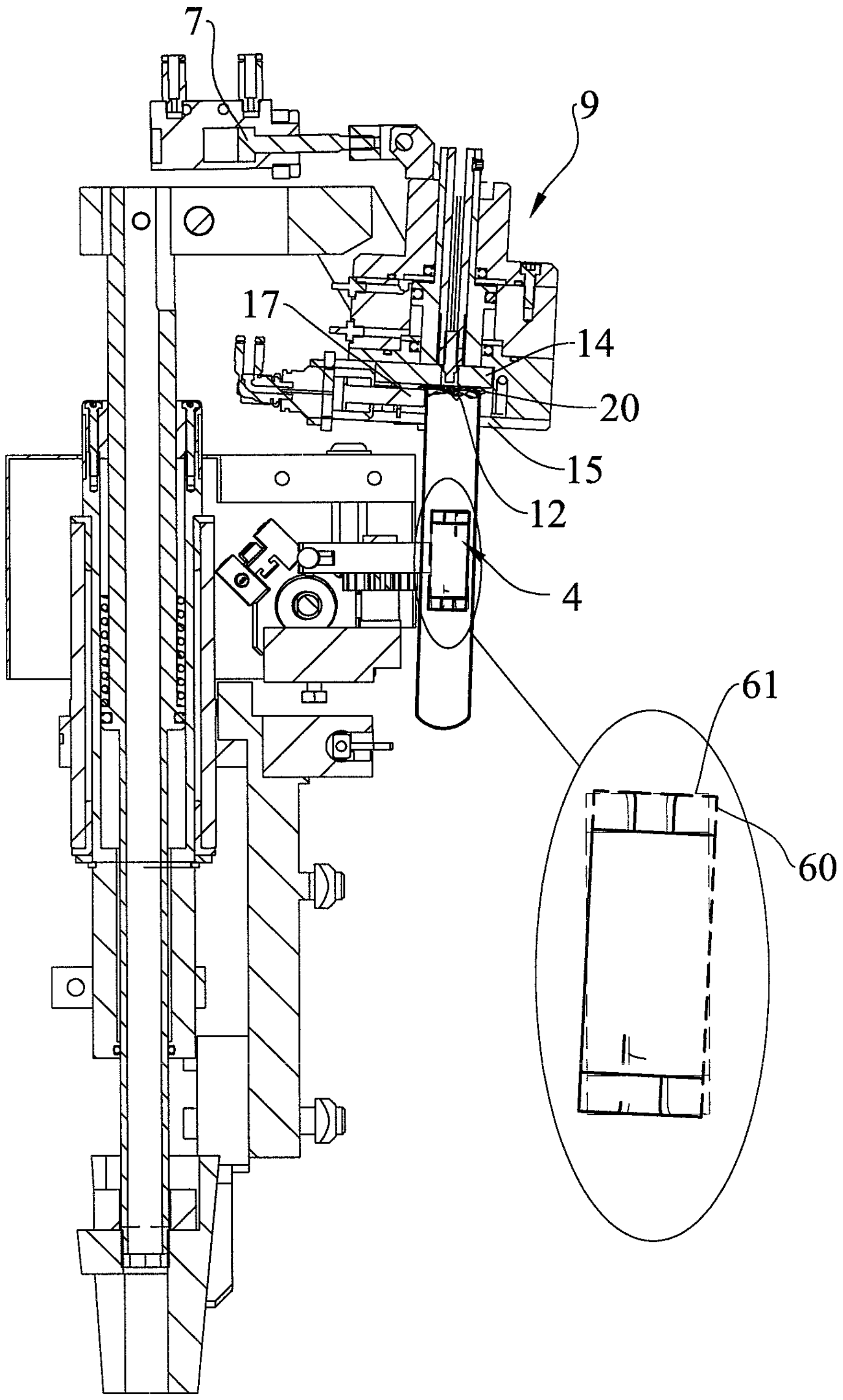
FIG. 6 is the same lateral sectional view of FIG. 5, with an enlarged part, in a subsequent working position.

In FIG. 6 is shown a small gap between the upper pinch plate 14 and the lower pinch plate 15, on the order of a few millimeters. Thus, a portion 20 of the overhanging seal 12 is resident between the upper pinch plate 14 and the lower pinch plate 15.

A pusher arm 17 is attached to the piston of the pneumatic cylinder 16 such that it can be driven forward and backward within the cavity 13 inside the head assembly 9. The cylinder 16 and the pusher arm 17 are mounted to the upper pinch plate 14. Other embodiments of the actuated pusher arm might include an electric solenoid and shaft.

In the embodiment shown, the pusher arm 17 has been actuated by the cylinder 16 to push it forward inside the cavity 13 until it impinges on the back side of the specimen container 3 and seal 12. This also forces the top of the specimen container 3 (slightly tilting said specimen container 3 allowed by the pins 63 of the gripping arms 4) and seal 12 forward in the cavity 13.

Since there is a gap between the upper pinch plate 14 and the lower pinch plate 15, and the tubular top and seal 12 are flush against the bottom of the upper pinch plate 14, this insures that a portion 20 of the overhanging seal 12 is between the two pinch plates 14, 15 and that the specimen container 3 is applied forcibly to the lower pinch plate at the point tangent to the circle formed by the outside of the tubular top of the specimen container 3.

Figure 7:
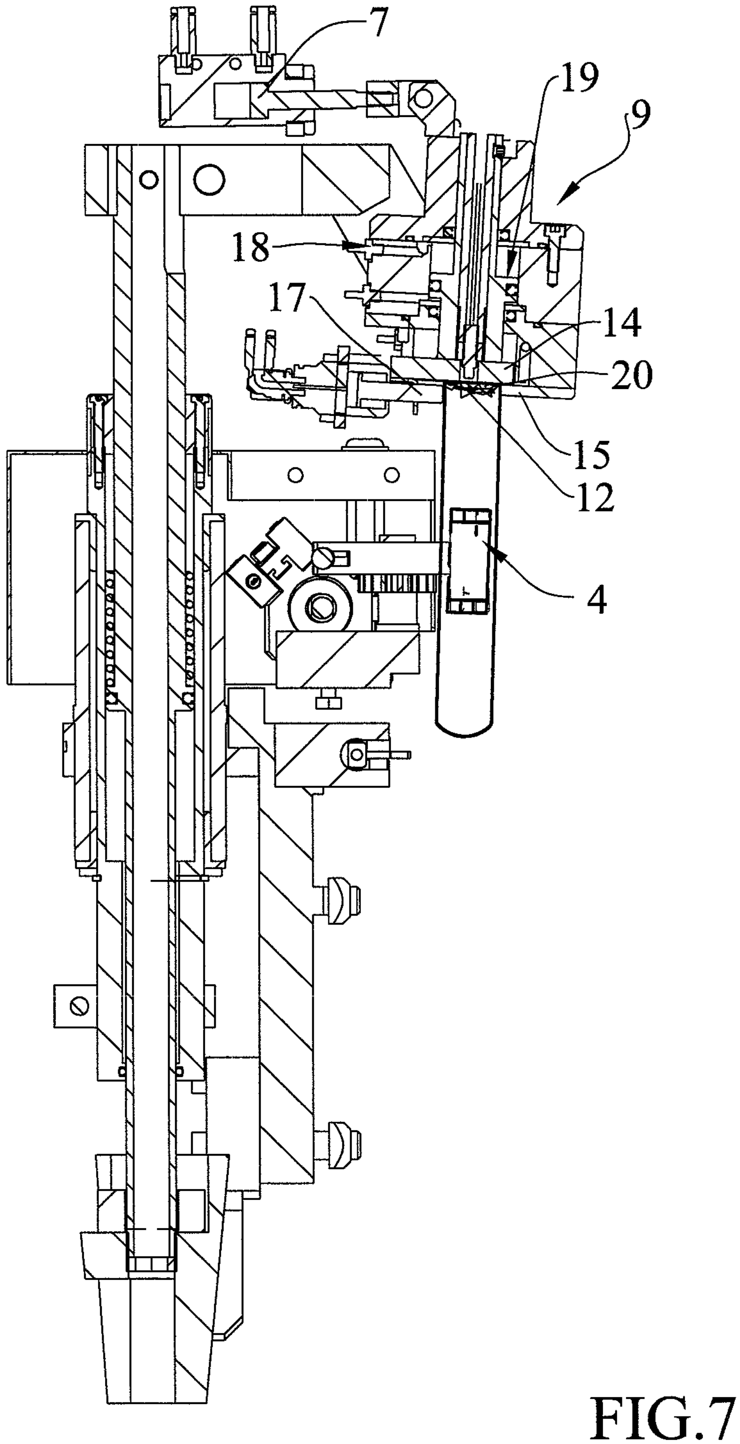
FIG. 7 is the same lateral sectional view of FIG. 6 in a subsequent working position.
Figure 8:
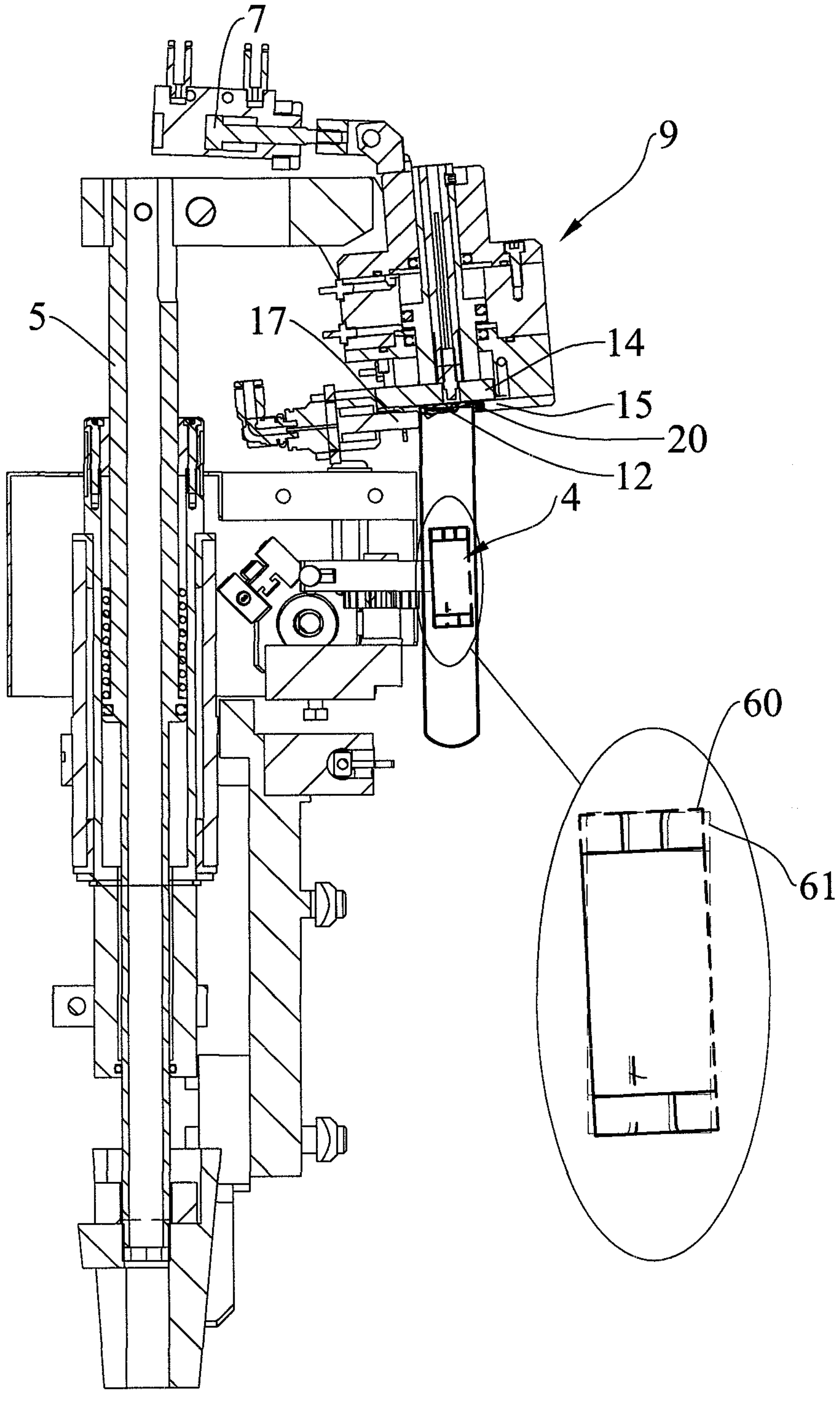
FIG. 8 is the same lateral sectional view of FIG. 7, with an enlarged part, in a subsequent working position.

Referring to FIG. 7, the upper pinch plate 14 within the head assembly 9 is attached to a pinch drive shaft 19, which forms the piston of a pneumatic cylinder motor 18 within the head assembly 9. This is used in the current embodiment to force the upper pinch plate 14 against the head of the container (3) so providing the upward movement of the lower pinch plate 15 with the head assembly 9 (and the shaft 5).

Therefore a pinching portion 20 occurs between the pinch plates 14,15.

During the removing motions said axis 80 belongs or is almost parallel to the upper pinch plane 14, and almost tangent to the closest portion of the circumference of the tubular specimen container 3.

The rotation of the head assembly 9, during the removing motions, toward the vertical shaft 5, allows the opposite part to move up therefore pulling up the flexible film seal 12. The following raising of the head assembly 9 drags the flexible film seal 12.

The motion of the pinch drive shaft 19 might also be achieved with other embodiments such as an electronic solenoid and shaft assembly.

Next the pusher arm 17 is retracted by reversing the actuating force on the pneumatic cylinder 16 to move out of the cavity 13, as the pusher arm 17 is no longer needed once there is a grasp on the container by means of the pinched seal 12.

An important and distinguishing aspect of the apparatus and method of the invention is the motion that follows. The linkage 8 is drawn backward by the pneumatic cylinder 7 which drives it, causing the head assembly 9 to rotate backwards (counterclockwise rotation, FIG. 8) through an angle of approximately 10° (approximately 5° with the vertical), taking the pinched portion of the seal 12 with it from the pinch point 20 (FIG. 7). As mentioned earlier, the axis for this rotation of the head assembly 9 is positioned strategically relative to the opening in the specimen container 3. To wit, the axis of rotation is in the same plane as the circle prescribed by the opening in the specimen container 3 (so almost belonging or parallel to the plane of the upper pinch plane), and is tangent to it at a point diametrically opposed to the pinch point 20 at the front of the circle. The net effect of this orientation is that the seal 12 is pulled up and back relative to the opening to which it is attached along a circular arc, the radius of which is approximately the width of the opening. The result of this particular lifting geometry is to avoid tensile forces on the seal 12 itself, enabling the entire lifting force on the seal 12 to be applied toward rupturing the bond between the seal 12 and the specimen container 3. This, in turn, leads to a clean parting of the seal from the opening of the container such that the opening is free of detritus from the seal 12 and amenable to reapplication of a subsequent seal.

The action performed by the backward rotation (counterclockwise rotation) of the head assembly 9 performs the initial rupture of the bond between seal 12 and specimen container 3 at the pinch point 20 and propagates the rupture through a portion of the circle prescribed by the opening and the bond.

The portion varies according to the ductility of the foil or film constituting the seal 12, as a more ductile material will tend to stretch and absorb some of the parting force, thus parting less of the portion of the circular bond. A more refractory material will transmit more of the parting force through the seal, causing a greater portion of the circular bond to be ruptured.

Figure 9:
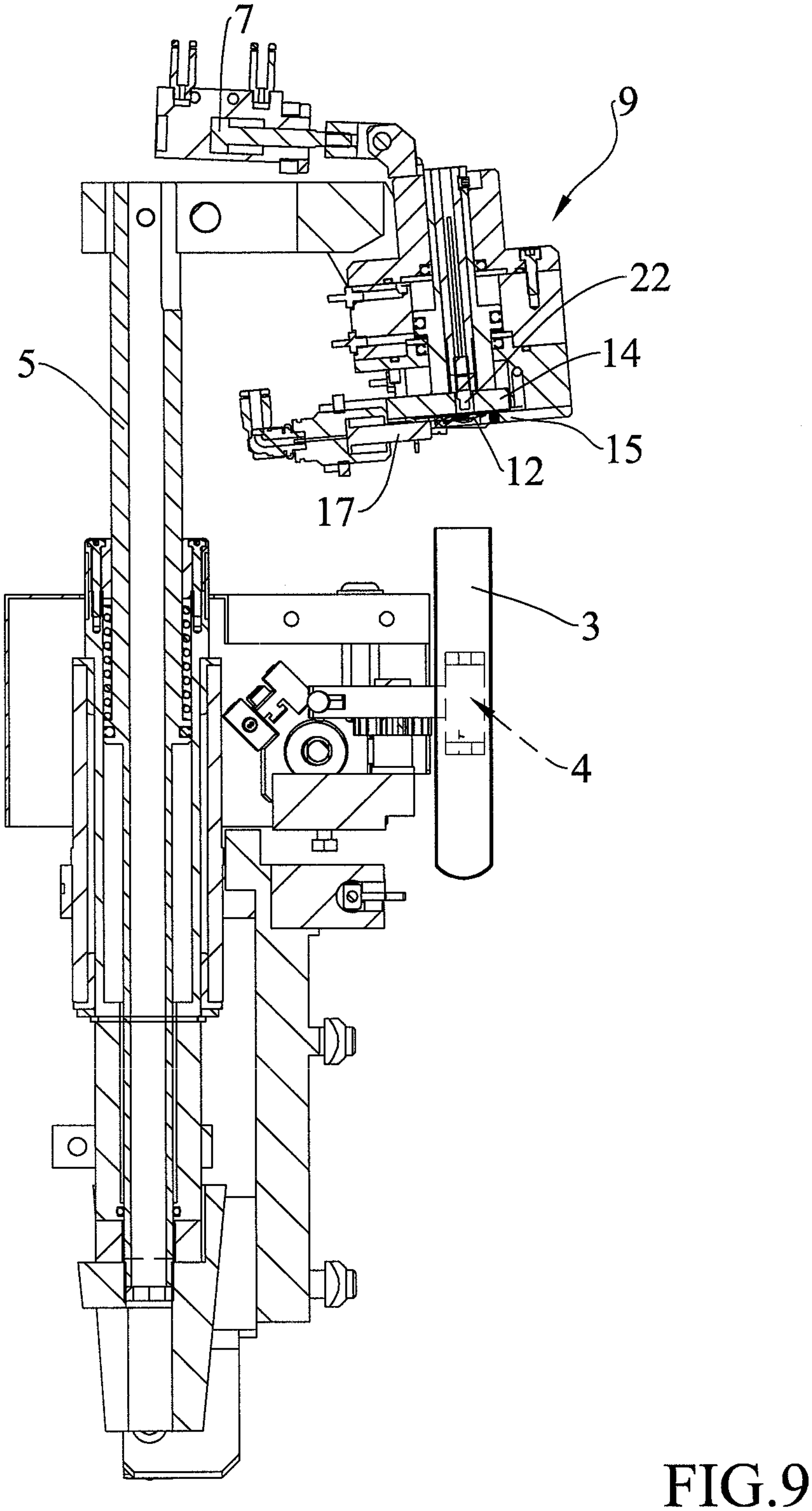
FIG. 9 is the same lateral sectional view of FIG. 6 in a subsequent working position.

The remaining portion of the bond is then ruptured in a second motion by raising the entire head assembly 9 by means of the vertical drive on the shaft 5. As the head assembly 9 rises along with the shaft 5 and mounting bracket 6 to which it is attached, it takes the seal 12 along with it, pulling it from the specimen container 3 and rupturing the remaining bond with the circular opening (FIG. 9). However, in this case the parting motion does not follow the circular arc prescribed by the diameter of the seal.

Instead the seal is pulled in a direction perpendicular to the plane of the circle which prescribes the opening of the specimen container 3, causing the seal to form a plane between the pinch point 20 and the points on the circle at which the bond is not yet ruptured. Since the parting action applied by the initial rotation of the head assembly 9 has already ruptured a portion of the circular bond prior to this motion, the angle at which the straight line formed by the plane of the seal intersects the plane of the opening is steep, causing the majority of the vertical force vector to apply to the remaining bond points.

Without the initial rotational parting motion which began the bond rupture, this would not have been the case. That is, if the head assembly 9 has merely been raised vertically subsequent to forming the pinching grasp on the seal 12 at the pinch point, as in FIG. 5, the angle which the plane of the seal 12 forms with the plane of the opening at that point is zero, meaning that the entire vertical force would be entirely applied to the overhanging seal material itself and not to the bonding plane, resulting in high ductile deformation of the seal material prior to beginning the rupture of the bond. Under such conditions the bond does not part cleanly and the circular opening of the specimen container 3 is not amenable to the reapplication of a subsequent seal due to detritus left by the torn seal 12 and poorly ruptured bond.

Following removal of the seal 12 from the specimen container 3, the waste seal 12 remains in the grasp of the pinch plates 14, 15 at the pinch point 20 in the head assembly as depicted in FIG. 9, where the detecting sensor 22 controls the effective presence of said waste seal.

Figure 10:
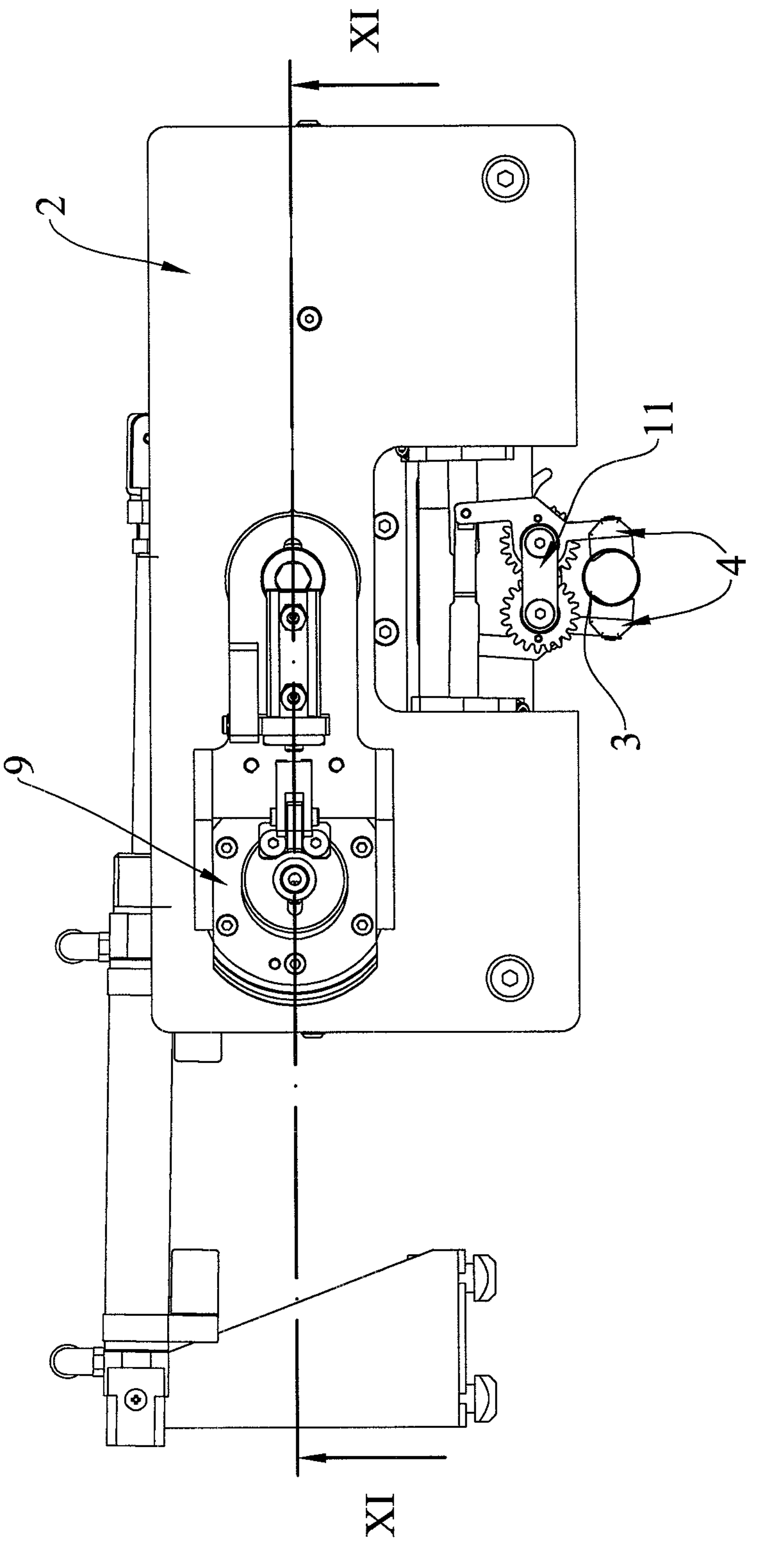
FIG. 10 is a top view with the head assembly rotated of substantially 90°.
Figure 11:
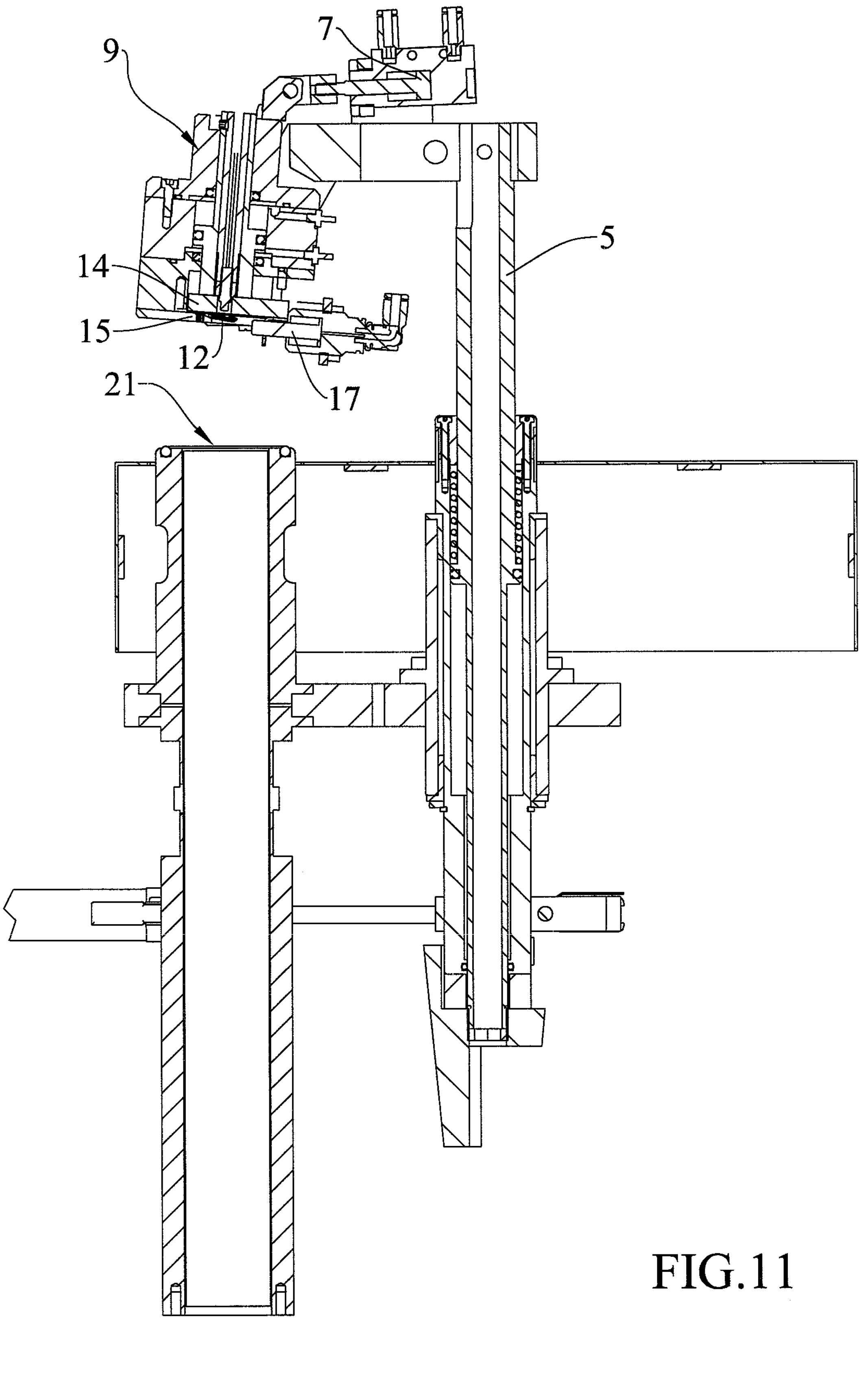
FIG. 11 is a lateral sectional view according to line XI-XI of FIG. 10.
Figure 12:
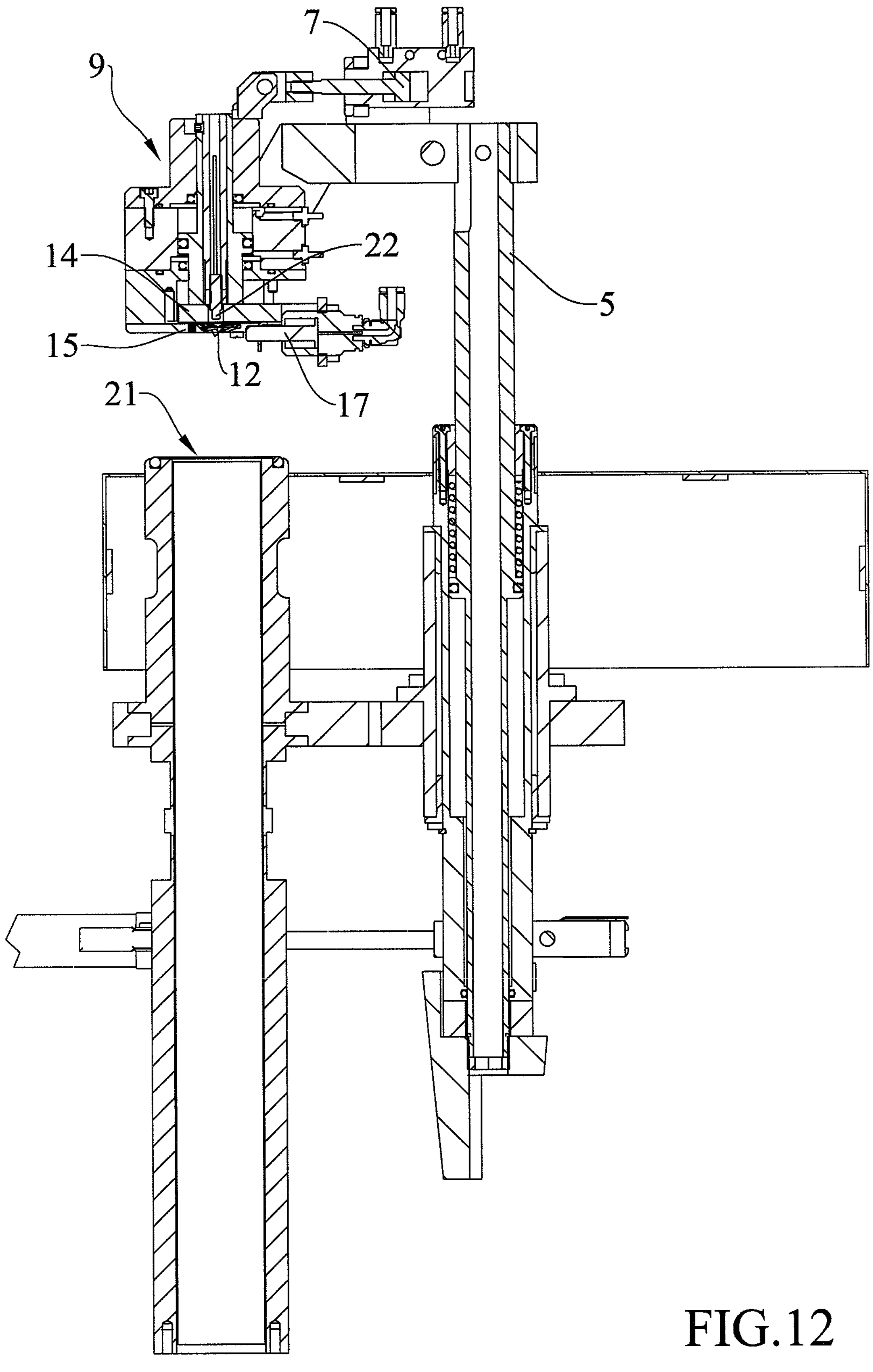
FIG. 12 is the same lateral sectional view of FIG. 11 in a subsequent working position.
Figure 13:
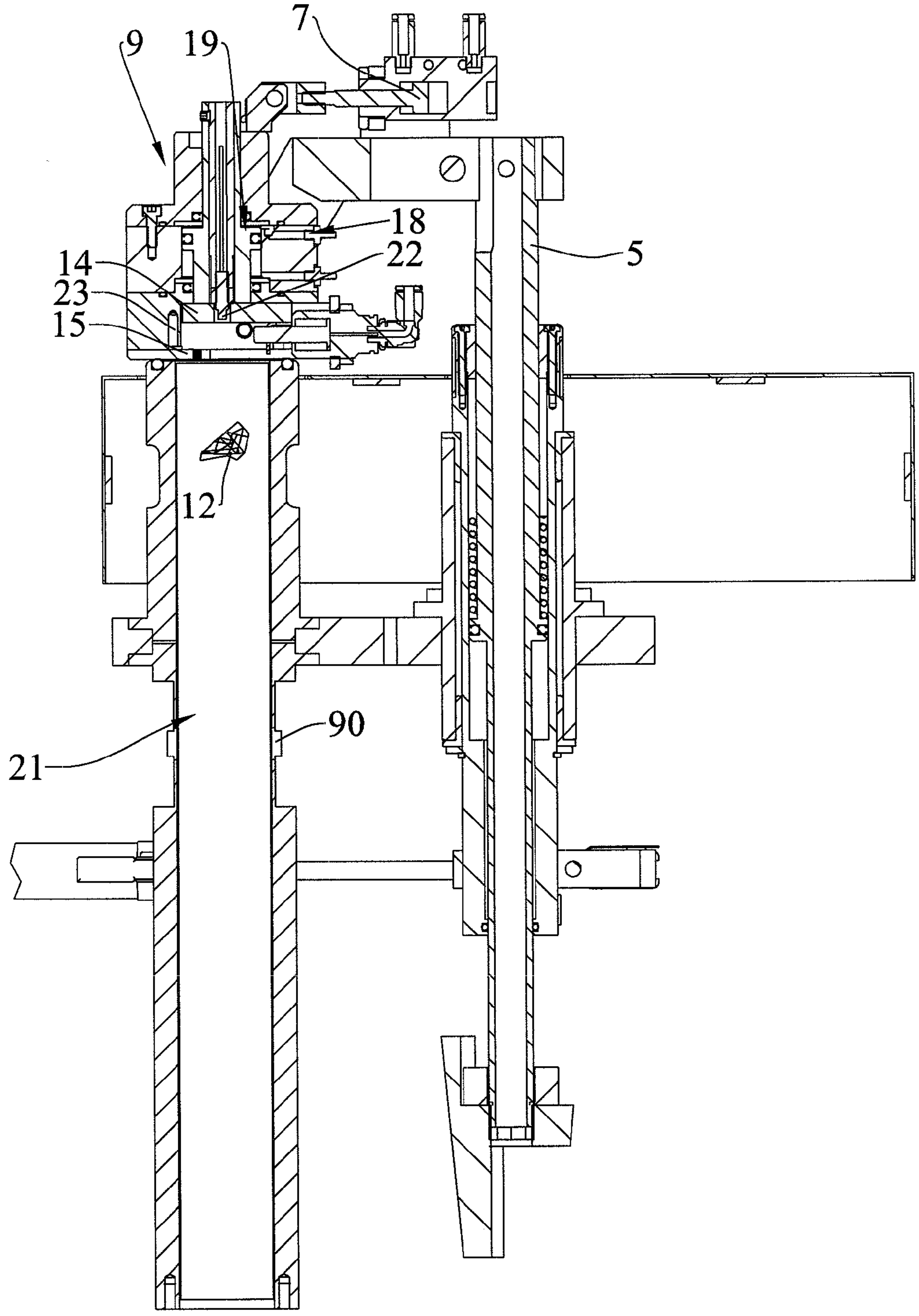
FIG. 13 is the same lateral sectional view of FIG. 12 in a subsequent working position.
Figure 14:
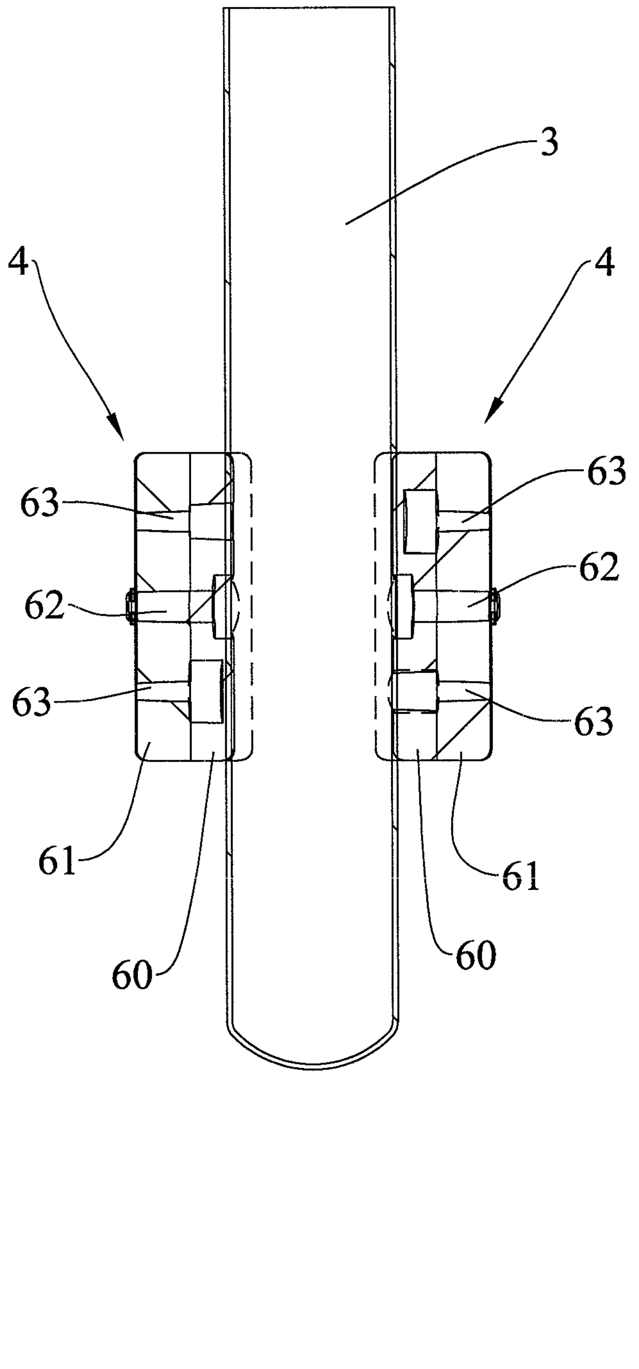
FIG. 14 is a sectional view according to line XIV-XIV of FIG. 3.

In the next step performed by the apparatus, the rotational drive associated with the shaft 5 is engaged to rotate the entire assembly such that the head assembly 9 is positioned directly over the waste chute 21 (FIGS. 8-11). The vertical drive associated with the shaft 5 is then engaged to lower the head assembly 9 until its lower surface rests on the upper surface of the waste chute opening, as depicted in FIG. 10. The opening of the waste chute forms a substantially circular platform onto which the weight of the head assembly 9 rests in the downward position. The pneumatic cylinder 18 is pressurized such that the pinch drive shaft 19 is driven up, thereby raising the upper pinch plate 14 to which it is attached. This reforms the gap between the upper pinch plate 14 and the lower pinch plate 15, allowing the grasp on the waste seal 12 to be released.

Since the pinched seal material often adheres to the pinch plates, it is forcibly ejected from the cavity 13 in the head assembly by pressurized air means 23 contained within the head assembly through a hole in the upper pinch plate 14 which is so positioned as to be centered on the approximately circular area occupied by the waste seal once removed.

Contemporaneously to the action of the pressurized air, the sensor 22 is monitoring the release of the seal. Such sensor, in this embodiment, is realized with an optical fiber that conveys the optical signal, by capturing the optical beam reflected by the seal when said seal is present. Other optical devices can be used for such monitoring action.

The waste chute 21 is equipped with a detecting passage sensor (90) (FIG. 13) that monitors the waste chute and can detect the passage of the waste seal through the chute. In the current embodiment, the sensor is an optical interrupter, but other embodiments capable of detecting the passage of the waste seal 21 are possible. The signal from the sensor is provided to the parent system such that it can determine the success of the seal removal operation performed by the apparatus by assumption derived from the passage of the waste seal through the waste chute.

Finally, the head assembly 9 is driven back to the upper position by engaging the vertical drive associated with the shaft 5, and then returned to the starting position over the seal removal station by engaging the rotational drive associated with the shaft 5, thus completing the seal removal operation and making ready for the next cycle of same.

It may happen that the head assembly 9 is not successful to take and remove the seal.

In this case the removal operation may be repeated upon rotation of the specimen container 3 with respect to the original position.

The invention claimed is:

1. An apparatus for removing a flexible film seal from a tubular specimen container which comprises:

a vertical mounting shaft upon which is mounted a bracket for a head assembly, said head assembly having a cavity and pinch plates;

driving means for causing a coupling motion of said head assembly and said specimen container towards each other for receiving the flexible film seal into said cavity; and means for operating said pinch plates for pinching the flexible film seal and said driving means, causing the removal of said head assembly and said specimen container away from each other to remove the flexible film seal from the head of the specimen container, wherein a pusher arm, which is movable by a piston of a pneumatic cylinder, forces a punching portion of the flexible film seal between the pinch plates.

2. The apparatus according to claim 1, wherein the coupling motion comprises:

a rotation of the head assembly such that its upper part moves toward the shaft;

a lowering motion onto the specimen container to guide the cavity onto the head of the container; and a rotation of the head assembly to an upper position.

3. A process for removing a flexible film seal from a tubular specimen container by utilizing the apparatus according to claim 1, which comprises the following steps:

immobilizing the specimen container;

rotating the head assembly such that its upper part moves toward the mounting shaft;

lowering the head assembly onto the container to guide the cavity onto the head of the container;

rotating the head assembly to a vertical position;

rotating the head assembly such that its upper part moves toward the shaft to pull up the flexible film seal;

pushing the pusher arm to force the pinching portion of the flexible film seal between the pinch plates;

pinching the pinching portion of the flexible film seal; and raising the head assembly to remove the flexible film seal.

4. The apparatus of claim 1, wherein a detecting sensor is operatively associated with the pinch plates for effecting engagement with the flexible film seal.

5. The apparatus of claim 1, wherein progressive tilt adjustments of the head assembly, in cooperation with the pusher arm, enables the correct positioning of the top of the specimen container inside the head assembly cavity.

* * * * *